Patented Apr. 10, 1934

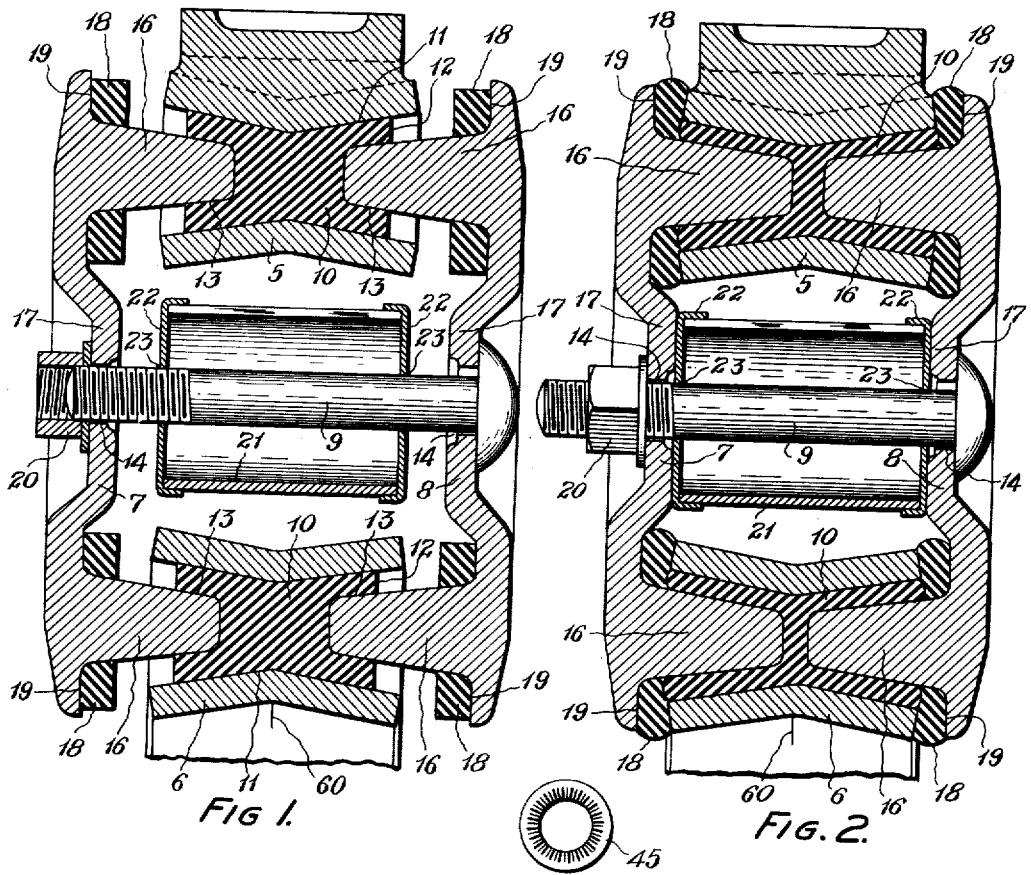

1,954,276

UNITED STATES PATENT OFFICE 1,954,276

CUSHIONING MEANS AND METHOD

Oscar U. Zerk, Cleveland, Ohio

Original application March 30, 1931, Serial No. 526,183. Divided and this application November 23, 1931, Serial No. 576,920

15 Claims. (Cl. 267—54)

My invention relates to cushioning means and methods, of the type wherein a resilient cushioning element is interposed between inner and outer parts of a joint.

The modern trend in automobile design is to use in place of a lubricated spring bolt, a rubber bushing composed of an outer metal tube, a rubber tube and an inner metal tube or of a rubber tube of substantial size placed between the spring eye and the spring bolt.

The use of such a rubber tube necessarily increases the required inside diameter of the spring eye to about twice the usual diameter. It is known in the art of spring making that increasing the inside diameter of an open seamed spring eye decreases the strength of the spring eye, so that the spring eye is susceptible to opening responsive to road shocks, causing rattling noises, excessive wear and great danger of breaking or entirely snapping off the spring eye from the spring.

In certain embodiments of my present invention, I propose preferably to employ a very strong spring eye for a leaf spring without the necessity of riveting a separate eye device thereto and without using a heavier spring thickness. This is accomplished by progressively varying the diametrical dimensions of the spring eye proceeding from its mid portion toward its ends and I thereby accomplish the very desirable result of a much stronger spring eye for a given spring thickness. If desired considerably thinner leaf springs may be employed for a given spring eye strength.

In the following specification I disclose spring eyes formed with enlarged ends and others having enlarged mid portions.

The double conical form of the spring eye bore lends itself to the ready endwise insertion of tubular rubber cushioning elements into the eye as an operation preliminary to the assembling of the oscillatable joint elements of the vehicle chassis and spring eye, as will more fully appear from the following description of certain embodiments of my invention.

However, my invention in its broader aspects is not limited to the conical or double conical form of spring eye, but comprises a novel method article of manufacture and cushioning apparatus, involving the use of a single block of rubber insertable into a tubular recess of a mechanical joint wherein it is exposed to opposing pressures directed inwardly of the recess from its two ends to effect a "flowing" of the rubber material from between the pressure elements to cause portions of the rubber to be exposed to axial pressures and other portions of the rubber to be exposed to radial pressures exerted between the compressing elements and by said elements and the walls of the tubular recess, respectively.

Also, I suitably form the rubber cushioning element so that during the final assembly operation involving compression of the cushioning element, the rubber material while maintained under compressive stress will be forced to flow in a limited predetermined uniform manner. Thus, in those embodiments of applicant's invention employing the double control form of spring eye bore, the rubber material is placed under both lateral and radial compressive stress, and will flow along the generally conical walls of the spring eye to occupy approximately all of the space between the two relatively oscillatable joint parts.

An object of my invention is to provide an improved cushioning joint for relatively oscillatable parts of a mechanism.

Another object of my invention is to provide an improved cushioning joint for relatively oscillatable parts of an automotive vehicle one of said parts being the eye of a supporting leaf spring thereof.

Another object of my invention is to provide an improved cushioning joint for relatively slightly oscillatable parts of a mechanism comprising an inherently yieldable rubber cushioning element which may be assembled into a tubular eye of one of the mechanism parts, directly on the mechanism without a previous assembling operation of the joint parts per se, before application to the mechanism.

Another object of my invention is to provide an improved shackle mechanism.

Another object of my invention is to provide a highly efficient cushioning joint for relatively oscillatable parts of mechanisms.

Another object of my invention is to provide an improved article of manufacture comprising a body of suitably formed rubber material adapted for insertion into a cushioning joint of a mechanism.

Another object of my invention is to provide an improved method for achieving the assembly of the parts of an improved cushioning joint employing a single block of rubber.

Another object of my invention is to provide an improved cushioning joint employing a single block of rubber adapted to be assembled when the parts of the mechanism associated with said joint are assembled.

Other objects of my invention itself and the invention will become more apparent to those skilled in the art to which my invention appertains by reference to the following description of certain embodiments of my invention which are illustrated in the accompanying drawing wherein:—

Figs. 1 and 2 are transverse sectional views of a cushioning shackle joint mechanism embodying my invention, Fig. 2 showing the assembled mechanism, and Fig. 1 showing the parts thereof approaching the assembled condition;

Figs. 3 and 4 are views respectively corresponding to Figs. 1 and 2 of a cushioning joint mechanism embodying another form of my invention, Fig 3 showing the parts thereof approaching their assembled condition, and Fig. 4 showing the parts in their relatively fully assembled condition;

Fig. 5 is an end view of compression elements of Figs. 3 and 4.

Referring now to the embodiment of my invention illustrated in Figs. 1 and 2, I show at 5 and 6 the terminal eyes of a supporting hanger 1 and a leaf spring 2 respectively, said eyes both being of like tubular double conical form, the tubular recess being of least diameter at their intermediate waist portions and flaring outwardly therefrom in both directions.

The leaf spring 2, as more fully described in my co-pending application, Serial No. 526,183, filed March 30, 1931, of which the present application is a division, is preferably of flat cross-sectional form throughout its length, except at its ends which are of the above described double tapered tubular form shown in the drawing.

At 10, Fig. 1, I show a block of rubber having a substantially hourglass shaped outer surface, i. e. with a reduced waist, and having oppositely disposed and extending polar recesses 13 which, as shown in Fig. 1 are initially shallow, and are provided for the purpose of centering the prongs of the shackle mechanism, as subsequently described relative to the hanger eye and spring eye tubular openings.

Rubber is a relatively incompressible material and upon compressive stresses being exerted thereon the rubber will tend to flow in directions where the compressive stresses are absent or prevalent to a less degree.

Into each of the eyes 5 and 6 a block of rubber 10 is forced, the rubber block initially having its outer peripheral walls 11 of the same form and dimensional characteristics as the inner wall surfaces of the shackle and spring eyes, the ends 12 being planular except that centrally each end is provided with a recess 13 extending inwardly or perhaps one-half the distance from the annular planular wall portion 12 to the middle portion of the rubber body which incidentally is of least diameter.

Fig. 1 shows the rubber bodies which form the cushioning elements of this embodiment of my invention in substantially their normal form or at least but slightly departing therefrom. Fig. 1 illustrates other parts not yet named, but including shackle elements 7 and 8 and associated parts ready to be operated upon to effect assembly of the various elements of the shackle mechanism, whereas Fig. 2 shows the parts completely assembled.

After the rubber cushioning elements 10 are positioned in the spring eyes their polar recesses 13 are disposed co-axially within the tubular spring eye and presented toward either end thereof.

7 and 8 illustrate substantially like shackle elements each comprising inwardly projecting portions 17, which are centrally apertured at 14 to receive the shackle bolt 9, shown in place ready to perform its clamping function, later described. Each of the shackles also comprises a pair of like tapered posts 16, which are relatively spaced according to the desired spacing of the spring eyes and are positioned to project inwardly into the different polar recesses 13 of the two rubber cushioning element bodies 10 into which their ends normally readily fit, as illustrated in Fig. 1.

Each of the shackles 7 and 8 of Figs. 1 and 2 are of novel form consisting of a pair of posts 16, each of which take the place of half of a spring bolt, integrally formed with an intermediate supporting shackle portion, which is centrally channeled to increase the rigidity of the shackle.

The integrally formed shackle and half bolt elements are preferably made first by cutting off a certain length of a round bar, then coning both ends thereof to provide the posts 16, then bending the bar to substantially U shaped form, and then upsetting the material adjacent the bases of the posts 16, so as to provide a flange head for each post and to provide the centrally disposed channel shaped recess portion intermediate the bolts, which is centrally apertured at 14 intermediate the bolts, the shackle portion being also flattened as shown.

A very inexpensive rigid shackle construction is thus provided and wherein the separate posts 16 and 17 integrally formed with the shackles, perform the functions of shackle bolts, in conjunction with the single shackle bolt 9, which is thus not required to be projected through a spring eye with attendant disadvantages in the assembling operation.

Prior to the insertion of the ends of the posts 16 into the cushioning element recesses 13, there will be preferably positioned over each of said posts a rubber annulus 18, which is of suitable form as to fit onto the base portions of said posts and against the preferably planular annular face portions 19 bordering the post spaces.

Also, as shown in Fig. 1, I provide a spacing element consisting of a metal tube 21 which preferably may have a longitudinal seam, for purposes of economy in manufacture, provided with end caps 22 both of which are centrally apertured to permit the assembled tube and caps to be placed with the apertures 23 disposed in alignment with the shackle aperture 13 whereby the bolt 9 may be successively projected through all of said apertures to position the capped tube on the bolt between the shackles.

The parts above referred to then being positioned as shown in Fig. 1 and the shackle bolt 9 being projected successively through the aperture 14 as shown, the nut 20 is placed on the threaded end of the bolt and turned to its ultimate position as indicated in Fig. 2 to accomplish inward movement of the opposing pairs of tapered arms 16 to displace the rubber material of the blocks 10 longitudinally outwardly toward the ends of the spring eyes until sufficient of the rubber material 10 has been displaced to substantially entirely fill the space in the spring eye disposed intermediate the eye walls and the opposing surfaces of the arms 16. At this time the ends of each joined pair of arms 16 approach quite closely to the opposing ends of the other pair of like joined arms and the rubber material flowing from the space disposed intermediate the arms is compressed therebetween and between the lateral surfaces of the arms and the inner walls of the eye opening.

Turning of the nut 20 on the bolt 9 also ultimately brings the rubber washers 8 into compression to fill the space between the ends of the spring eye and the rubber cushioning element 10 substantially flush therewith, and the annular substantially planular surfaces such as 19 of the shackles which surround the bases of the arms 16.

Also, compression of the washers 18 tends to cause the rubber material of the washers to flow radially, to cause them to take the forms shown in Fig. 2, as distinguished from their initial forms shown in Fig. 1.

The home position of the nut 20 on the bolt is determined by the rigid engagement ultimately effected between the end caps 22 for the spacing tube 21 with the inwardly projecting portions 7 of the shackles. So far as all operative effects are concerned consequent to assembly of the cushioning washer 18 and cushioning element 10 are concerned, these washers and the main body portion of the cushioning element act as if they were originally made from one piece of rubber, being very intimately pressed together in their contiguous surfaces.

In Figs. 3 and 4, the same type of channeled vehicle spring eye may be employed at 41, in a spring shackle mechanism or the like, in a manner involving some of the means and characteristics of the shackle mechanism of Figs. 1 and 2, but distinguished therefrom as will be now related.

The embodiment of Figs. 3 and 4 employs a single integral block of rubber 42 which is first forced inwardly into the spring eye 41 in any suitable way. The rubber block 42 is in the form of a tube having a relatively small axial bore terminating in axial polar recesses and an outer peripheral surface which is of progressively increased diameter from the ends of the tubular rubber block to its middle portion. The said outer peripheral surface of the rubber block closely approximates in dimensional characteristics, those of the interior walls of the spring eye opening.

At 43 and 44, I show a pair of oppositely disposed axially aligned tubular metal compression elements for the rubber block 42 whose rounded blunt ends 45 are seized within the polar recesses thereof and on the outwardly projecting midportions of said tubular compression elements 43 are disposed a pair of rubber washers 46, one at each end edge of the spring eye.

The spring eye with its contained rubber insert 42 with axially projecting tubular compression elements 44 carrying the washers 46 are then shiftable as a unit to a position between the parallel arms 47 of a shackle or like mechanism sought to be resiliently coupled with the spring having the eye 41, whereupon through apertures of the arms 47 and through axially aligned bores of the compression elements 43 and 44 and of the intermediately disposed rubber body 43, the bolt 48 is projected and thereafter a nut 49 is turned onto the threaded end 50 of the bolt to tightly compress the parts in assembled relation as shown in Fig. 4, wherein the ends of the compression elements 43 and 44 are preferably brought into abutting relation. The rubber material of the body 43 is thereby displaced by extrusion from the central portion of the eye opening until the outwardly forced portions of the rubber reach the ends of the spring eye and engage by a pressure contact with the resiliently flattened rubber washers 46.

In this embodiment the compression elements 43 and 44 act first to produce a longitudinal thrust on the intermediately intervening portions of the rubber and then somewhat as wedges to displace the rubber outwardly.

As a further improvement, the ends 45 of the compression elements may be serrated as shown in Fig. 5 to provide a positive interlock between said compression elements to avoid relative rotational movements thereof.

In the spring eyes described in the foregoing specification, I accomplished the result of providing a very strong spring eye formed integral with a main spring 1 of a vehicle, or the like, without riveting the end of the leaf to the body thereof, and without using heavy spring stock. This results because of the fact that both the outwardly flaring spring eye, shown in Figs. 1 and 2 inclusive and the outwardly reduced spring eye of Figs. 3 and 4 inclusive are of substantially channel form in the circumferential direction, and therefore unwinding of the loop forming the eye is practically made impossible. It is to be noted that as shown at 60, that I continue to a progressively reduced degree the channel form of the leaf spring forming the spring eye for a short distance along the leaf spring proper.

This transfers stresses from the spring eye to the flexible portion of the spring which otherwise might tend to break the spring at the junction of the main spring portion and the spring eye.

In the embodiments illustrated in Figs. 1 and 2, the rubber cushioning means disposed within the spring eye is slightly in the form of a unitary rubber block of generally hourglass form, with substantially polar recesses, which extend about midway to the waist of the rubber body from each end thereof.

A rubber body so formed can be readily positioned within the spring eye tube whose bore is also of generally hourglass form, even though the inner walls thereof are of substantially the same dimensions as the outer walls of the rubber body, by forcing the body endwise into the eye opening, since the foremost polar recess 13 permits the inward deformation of the outwardly flaring circumferential foremost end portions, until the foremost enlarged end portion has been projected past the reduced waist of the eye opening.

The compressive stress exerted by the shackle arms 16, the ends of two of which are projected into the oppositely disposed polar recesses of each said rubber body 10, upon the rubber body results from the direct compression of the rubber material between the ends of the arms, forcible displacement of portions of the rubber therefrom, and resultant displacement by said first displaced rubber portions of rubber portions displaced along the outwardly flaring walls of the spring eye, augmented by the inward projection of the tapered side walls of each of the arms 16.

The resultant form of the rubber body 10, as illustrated in Fig. 2 is very favorable to the efficient performance of the functions which it has long been sought to accomplish by means of rubber cushioning elements in spring shackle joints or the like, i. e. the cushioning road shocks, and vibration effects, insulating the parts to prevent tonal vibrations being communicated therebetween, holding the parts with sufficient rigidity against undesirable lateral movements as to prevent undue side-sway and "shimmy" effects, coupled with the quality longevity of useful performance. The shackle arms are of novel form, previously described, which is conducive to the securing of maximum strength with a minimum amount of material.

The present application is a division of my copending application Serial No. 526,183, filed March 30, 1931.

Having now described my invention in certain specific embodiments, I am aware that my invention may be practiced in other embodiments and not departing from the spirit of my invention, and within the scope of the appended claims.

I claim:

1. In a mechanical joint connector, the combination with a hanger, of a leaf spring having a leaf comprising a main portion of substantially flat form terminating in an integrally formed tubular terminal eye, the walls of the eye being circumferentially channeled, an element of mechanism projected substantially axially into said eye, and interposed cushioning means composed of a single imperforate body of rubber or like inherently resilient material disposed intermediate the interior walls of the eye and said mechanism element, and subjected to axially directed pressure of said element exerted on an end of the body.

2. In cushioning joints, in combination a pair of parts of a mechanism, one of said parts comprising a substantially flat leaf spring terminating in a tubular eye having a bore of generally hour-glass form, the other comprising a pair of oppositely disposed arms, a body of rubber disposed within said eye and put under compression therein between the walls thereof and the walls of said arms including the end walls thereof by inward relative movement of said arms longitudinally of said bore toward the middle thereof effecting displacement of portions of said rubber body in an outward direction from between the ends of the arms, along the lateral surfaces of said arms.

3. A cushioning joint comprising a tubular eye of generally hour-glass form integrally secured to a substantially flat leaf spring, a body of rubber insertable therein having a reduced waist portion, a mechanical element comprising a pair of opposing arms adapted to be forceably directed into the two opposite ends of said eye opening toward each other to engage and forceably displace portions of said rubber material disposed between the ends of the arms to put the same under compression intermediate the inner wall surfaces of said eye and the outer surfaces of said arms disposed within the eye.

4. A shackle coupling for spring and hanger eyes comprising a pair of shackle links, each having a pair of spaced parallel prongs, each eye receiving a prong of a different one of said links, bolt means for pressing the shackles inwardly and a single integral body of rubber cushioning material in each eye maintained in compression by and between said prongs, and rubber washers held compressed between the ends of said eyes and said shackle links.

5. A shackle construction comprising a pair of shackle links, each having a pair of spaced parallel prongs, a pair of eyes each receiving a prong of a different one of said links, bolt means for pressing the shackles inwardly and a single integral body of rubber cushioning material in each eye maintained in compression by and between said prongs, said spring eyes each having a double tapered bore with a reduced waist portion, said rubber material being positioned in each eye bore before insertion of both the associated link prongs therein, and having portions displaced outwardly thereby and a pair of compressible washers compressed between opposite ends of the body and portions of the shackle links.

6. A cushioning joint connector for leaf spring eyes comprising an eye for the spring having a bore of progressively differing diametrical dimensions proceeding from its mid portion toward its ends, a solid body of rubber cushioning material, positioned within said eye bore, and a pair of compression plugs projected axially into said bore from the ends thereof toward the middle portion adapted to compressively displace some only of the rubber material from axial portions of the bore and a pair of rubber washers compressed upon the axial ends of the eye bore.

7. A cushioning joint connector for leaf spring eyes comprising an eye for the spring having a bore of progressively reduced diametrical dimensions proceeding from its mid portion toward its ends, an apertured body of rubber cushioning material, positioned within said eye bore, and a pair of compression plugs projected axially in said bore from the ends thereof toward the middle portion adapted to compressively displace some only of the rubber material from axial portions of the bore.

8. A cushioning joint connector for leaf springs comprising in combination with a vehicle supporting link mechanism a tubular eye for said spring, an integral body of rubber disposed in the eye, and a pair of inwardly directed elements of said mechanism projected from opposite ends of the eye, communicating oppositely directed pressure effects to opposite sides of the rubber body to cause the rubber of the said body to flow from the center of the body toward the outer edges of the eye and a washer of rubber compressed between portions of the mechanism and the ends of the eye.

9. A cushioning joint connector for leaf springs comprising in combination with a vehicle supporting link mechanism a tubular eye for said spring, an integral body of rubber disposed in the eye, and a pair of inwardly directed elements of said mechanism projected from opposite ends of the eye, communicating oppositely directed pressure effects to opposite sides of the rubber body to cause the rubber of the said body to flow from the center of the body toward the outer edges of the eye, said body provided with spaced oppositely extending polar recesses to receive the ends of said elements and a washer of rubber compressed between portions of the mechanism and the ends of the eye.

10. A cushioning joint connector for leaf springs comprising in combination with a vehicle supporting link mechanism, a concavo-convex spring eye, an integral body of rubber disposed in the eye, a pair of inwardly directed elements of mechanism projected from opposite ends of the eye and substantially uniformly spaced from the spring eye walls communicating oppositely directed pressure to opposite sides of the rubber body to cause the rubber of said body to flow from the center of the body toward the outer edges of the eye and a pair of washers compressed upon the opposite ends of the rubber body.

11. A shackle coupling for spring and hanger eyes comprising a pair of shackle links, each having a pair of spaced parallel prongs, a pair of eyes each receiving a prong of a different one of said links, bolt means for pressing the shackles inwardly and a single integral body of rubber cushioning material in each eye maintained in compression by and between said prongs, said eyes each having a double tapered bore with a reduced waist portion, and a pair of washers compressed between the shackle links and each end of the eyes.

12. A shackle coupling for spring and hanger eyes comprising a pair of shackle links, each having a pair of spaced parallel prongs, each eye receiving a prong of a different one of said links, bolt means for pressing the shackles inwardly and a single integral body of rubber cushioning material in each eye maintained in compression by and between confronting ends of said prongs, and rubber washers held compressed between the ends of said eyes and said shackle links.

13. A shackle coupling for spring and hanger eyes comprising a pair of shackle links, each having a pair of spaced parallel prongs, a pair of eyes each receiving a prong of a different one of said links, bolt means for pressing the shackles inwardly and a single integral body of rubber cushioning material in each eye maintained in compression by and between confronting ends of said prongs, said eyes each having a double tapered bore with a reduced waist portion, and washers compressed between portions of the shackle links and the ends of the eyes.

14. As an article of manufacture, a rubber body adapted for use as a cushioning element between two relatively oscillatable mechanical parts externally generally of double frusto-conical form with coincident bases, provided with a pair of substantially longitudinally oppositely extending polar recesses separated by a generally central web portion and having a coaxial bore therethrough.

15. As an article of manufacture, a rubber body adapted for use as a cushioning element in a mechanical joint having two relatively oscillatable mechanical parts, being of elongated form, externally generally of double frusto-conical form with coincident bases, provided with two oppositely disposed approximately axially aligned polar recesses and having an axial bore therethrough.

OSCAR U. ZERK.

CERTIFICATE OF CORRECTION.

Patent No. 1,954,276.   April 10, 1934.

OSCAR U. ZERK.

It is hereby certified that error appears in the printed specification of the above numbered patent requiring correction as follows: Page 1, line 68, for "control" read conical; page 2, line 1, strike out the word "itself" and insert the same after "invention" in line 2; page 3, line 136, for "displaced" read disposed; and that the said Letters Patent should be read with these corrections therein that the same may conform to the record of the case in the Patent Office.

Signed and sealed this 29th day of May, A. D. 1934.

Bryan M. Battey (Seal)   Acting Commissioner of Patents.

inwardly and a single integral body of rubber cushioning material in each eye maintained in compression by and between said prongs, said eyes each having a double tapered bore with a reduced waist portion, and a pair of washers compressed between the shackle links and each end of the eyes.

12. A shackle coupling for spring and hanger eyes comprising a pair of shackle links, each having a pair of spaced parallel prongs, each eye receiving a prong of a different one of said links, bolt means for pressing the shackles inwardly and a single integral body of rubber cushioning material in each eye maintained in compression by and between confronting ends of said prongs, and rubber washers held compressed between the ends of said eyes and said shackle links.

13. A shackle coupling for spring and hanger eyes comprising a pair of shackle links, each having a pair of spaced parallel prongs, a pair of eyes each receiving a prong of a different one of said links, bolt means for pressing the shackles inwardly and a single integral body of rubber cushioning material in each eye maintained in compression by and between confronting ends of said prongs, said eyes each having a double tapered bore with a reduced waist portion, and washers compressed between portions of the shackle links and the ends of the eyes.

14. As an article of manufacture, a rubber body adapted for use as a cushioning element between two relatively oscillatable mechanical parts externally generally of double frusto-conical form with coincident bases, provided with a pair of substantially longitudinally oppositely extending polar recesses separated by a generally central web portion and having a coaxial bore therethrough.

15. As an article of manufacture, a rubber body adapted for use as a cushioning element in a mechanical joint having two relatively oscillatable mechanical parts, being of elongated form, externally generally of double frusto-conical form with coincident bases, provided with two oppositely disposed approximately axially aligned polar recesses and having an axial bore therethrough.

OSCAR U. ZERK.

CERTIFICATE OF CORRECTION.

Patent No. 1,954,276.                                April 10, 1934.

OSCAR U. ZERK.

It is hereby certified that error appears in the printed specification of the above numbered patent requiring correction as follows: Page 1, line 68, for "control" read conical; page 2, line 1, strike out the word "itself" and insert the same after "invention" in line 2; page 3, line 136, for "displaced" read disposed; and that the said Letters Patent should be read with these corrections therein that the same may conform to the record of the case in the Patent Office.

Signed and sealed this 29th day of May, A. D. 1934.

Bryan M. Battey (Seal)                                Acting Commissioner of Patents.